SR CROSS REFERENCE SEARCH ROOM
XR 3,464,330

Sept. 2, 1 3,464,330

OPTICAL WRITING DEVICE

Filed Nov. 24, 1967 4 Sheets-Sheet 1

INVENTOR.
EDWARD V. LEWIS
BY John A. Duffy
ATTORNEY.

3464330
OR IN 354/4

OPTICAL WRITING DEVICE

Filed Nov. 24, 1967 4 Sheets-Sheet 2

INVENTOR.
EDWARD V. LEWIS
BY John A Duffy
ATTORNEY.

INVENTOR.
EDWARD V. LEWIS
BY John A. Duffy
ATTORNEY.

OPTICAL WRITING DEVICE

Filed Nov. 24, 1967

4 Sheets-Sheet 4

INVENTOR
EDWARD V. LEWIS
BY John A. Duffy
ATTORNEY.

United States Patent Office 3,464,330
Patented Sept. 2, 1969

3,464,330

OPTICAL WRITING DEVICE

Edward V. Lewis, Newport Beach, Calif., assignor to California Computer Products, Inc., Anaheim, Calif., a corporation of California Filed Nov. 24, 1967, Ser. No. 685,344
Int. Cl. G01d 9/42
U.S. Cl. 95—1 13 Claims

ABSTRACT OF THE DISCLOSURE

A tapered bundle of coated transparent fibers may be utilized to collimate monochromatic light from a distributed source into a narrow beam. The light source and bundle may be mounted on a recording apparatus for movement relative to a photosensitive medium in order to plot graphical information. By employing a plurality of bundles having different tapers in combination with light sources having separately energizable segments, a wide range of line widths and intensities may be made available.

BACKGROUND OF THE INVENTION

Information may be reduced to graphical form using various drawing devices such as cathode ray tubes and drawing pen plotters. Where photographic regenerations are required it is often desirable to lay out information directly on photosensitive materials. Typical examples include the manufacturing of printed circuit board masters, integrated circuit board masters, and the art work for etched tooling and vacuum deposition tooling. Most of these tasks are presently performed by tedious and painstaking manual operations. In order to effectively perform the operation automatically, it is necessary to provide an optical beam which may be rapidly moved with respect to a photosensitive material to form the desired graphical display. In addition, the spot intensity should be automatically variable in order to compensate for changes in writing velocities which would otherwise produce lines of varying widths and contrast. A further requirement of any versatile optical writing system is that the size and shape of the beam be variable so that a wide spectrum of graphical data can be drawn. Accordingly, it is an object of the present invention to provide a low inertia optical writing head which may be used in combination with present day incremental and analog plotting equipment.

A further object of the present invention is to provide an automatic method of varying the beam size, shape and intensity in order to accommodate a diverse multitude of recording requirements.

Other objects and advantages of the present invention will be apparent from the detailed description of a preferred embodiment given below.

SUMMARY OF THE INVENTION

The optical writing device described herein comprises a cartridge for storing one or more tapered fiber optic bundles each of which operates to collimate the energy generated by a monochromatic light source into a beam having a definite size and shape. The choice of beam size, shape and intensity is controlled by external circuitry which operates to select a particular light source and appropriately control the amount of electrical power applied thereto. This function is accomplished by utilizing electroluminescent panels having separately energizable segments as light sources. Each tapered fiber optic bundle has an associated panel in contact proximity with its entrance area so that the beam size and cross sectional shape at the exit area may be varied depending upon the combination of light panel segments which are energized. By utilizing several fiber optic bundles each having a different taper in combination with electroluminescent panels having several separately energizable segments, a multitude of spot sizes and shapes can be achieved without making manual changes.

The cartridge may be attached to standard plotting devices to record graphical information on photosensitive recording medium. By synchronizing the light source with external commands, uniform exposures may be achieved irrespective of the motion of the cartridge relative to the recording medium.

DETAILED DESCRIPTION OF A PREFERRED EMBODIMENT

Figure 1:
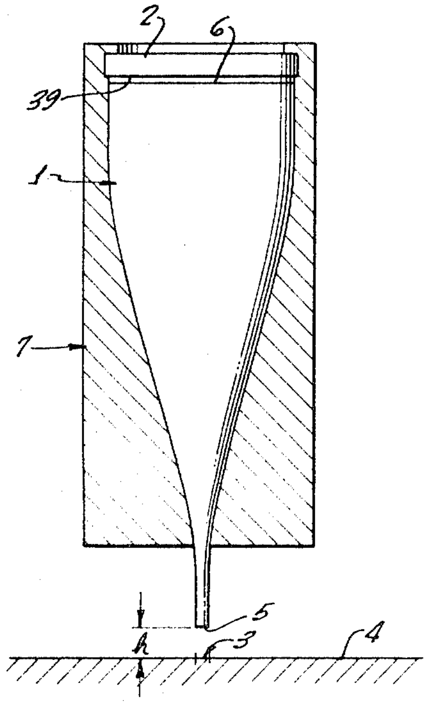
FIGURE 1 shows the structural relationship between the operative elements of a single station writing head.

FIGURE 1 illustrates the structural arrangement of the operative elements of the invention. A tapered fiber optic bundle 1 is used to concentrate the luminous energy from an optical source 2 upon a small locality 3 of a photosensitive recording medium 4. The light source 2 is typically an electroluminescent panel having its emitting surface 39 in close proximity with the entrance face 6 of the taper fiber optic bundle so as to minimize light loss between the source 2 and the optic bundle 1. Both the light source 2 and the optic bundle 1 are secured within a housing 7 which may be systematically translated with respect to the recording medium 4 so that the path of the light is photographically recorded.

Figure 2:
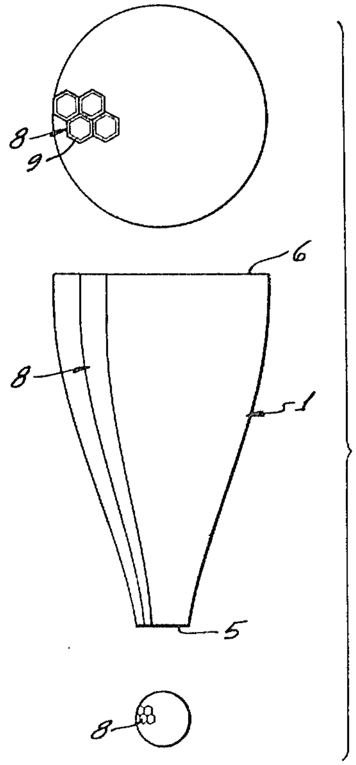
FIGURE 2 shows the details of construction of a tapered fiber optic bundle.
Figure 3A:
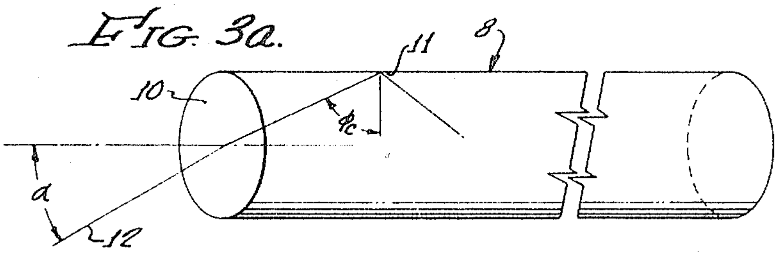
FIGURE 3*a* shows the geometry of the reflective path of a ray entering a single uncoated fiber at an angle equal to the numerical aperture.

The exact manner in which light from the source 2 is concentrated on the small area 3 may be understood by reference to the structural details of the tapered bundle 1, as shown in FIG. 2. As its name implies, the tapered bundle 1 is actually a bundle of individual light transmitting fibers 8, each of which is coated (9) with a material having a lower index of refraction than that of the fiber itself. Efficient conduction of light through a fiber 8 is made possible because of the phenomenon of total reflection. In principle, the conditions for total reflection exist at any smooth interface between two transparent media where the light is incident on the surface of the medium whose index is smaller than that of the medium in which the light is traveling. The critical angle, i.e., the angle of incidence which will result in total reflectance may be found from the well-known equation:

$$\sin \phi = n^1/n \quad (1)$$

where $\phi$ is the critilal angle and $n$ and $n^1$ are the indicies of refraction of the medium and adjacent surface, respectively. FIG. 3*a* shows a diagram of a light ray 12 entering the aperture 19 of an uncoated fiber 8 surrounded by air and reflecting from the innermost interface 11 at the critical angle $\phi_C$. The angle $\alpha$ is called the numerical aperture and represents the greatest angle at which skew rays may enter the aperture 10 and be totally reflected at the interface 11. From the simple geometry one obtains:

$$\text{Sin } \alpha = n^2 - 1 \qquad (2)$$

rays entering at greater than $\alpha$ will be transmitted by a long fiber 8 because of the dissipating effect of multiple imperfect internal reflections.

Figure 3B:
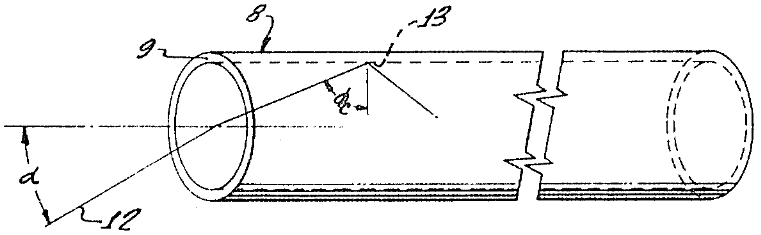
FIGURE 3*b* shows the geometry for a ray entering a coated fiber.

In practice, the presence of minute defects and contamination at the interface 11 interferes with the total reflection phenomenon by absorbing or scattering away a fraction of the incident light. This loss becomes important in long fibers where the number of reflections each ray may undergo is large. Furthermore, when the fibers 8 are fused together to form a bundle 1 as shown in FIG. 2 optical cross talk may result from the leakage of light across the interface between one fiber and another. Both of the above problems may be obviated by suitably cladding the individual fibers 8 with a transparent dielectric coating having a lower index of refraction than that of the fiber itself. The geometric relation for a meridional ray 12 entering a coated fiber 8 at an angle $\alpha$ so as to strike the coated interface 13 at the critical angle $\phi_C$ is shown in FIG. 3*b*. Using Snells law and Equation 1, the maximum angle $\alpha$ for transmittance may be calculated, i.e., $$\text{Sin } \alpha = n_1^2 - n_2^2 \qquad (3)$$

where $n_1$ is the index of refraction of the medium 8 and $n_2$ is the index of refraction of the cladding material 9.

As shown in FIG. 1, the bundle 1 and hence individual fibers 8 may be tapered so as to have a different cross-sectional entrance 6 and exit 5 areas. This is accomplished by heating and drawing the fused bundle of individually clad fibers. As a result of the coating which prevents leakage and assures perfect reflection, all rays which enter a given fiber at an angle less than $\alpha$ as determined by Equation 3 will theoretically emerge in a beam whose cross-sectional area is equal to that of the exit aperture. In practice it is possible to achieve practical area differences in the order of 20:1. Since the number of rays entering within the entrance numerical aperture must equal the number of rays departing from the exit aperture, the gain in light intensity will be proportional to the ratio of the areas of the entrance and exit apertures.

Figures 4A, 4B, 5:
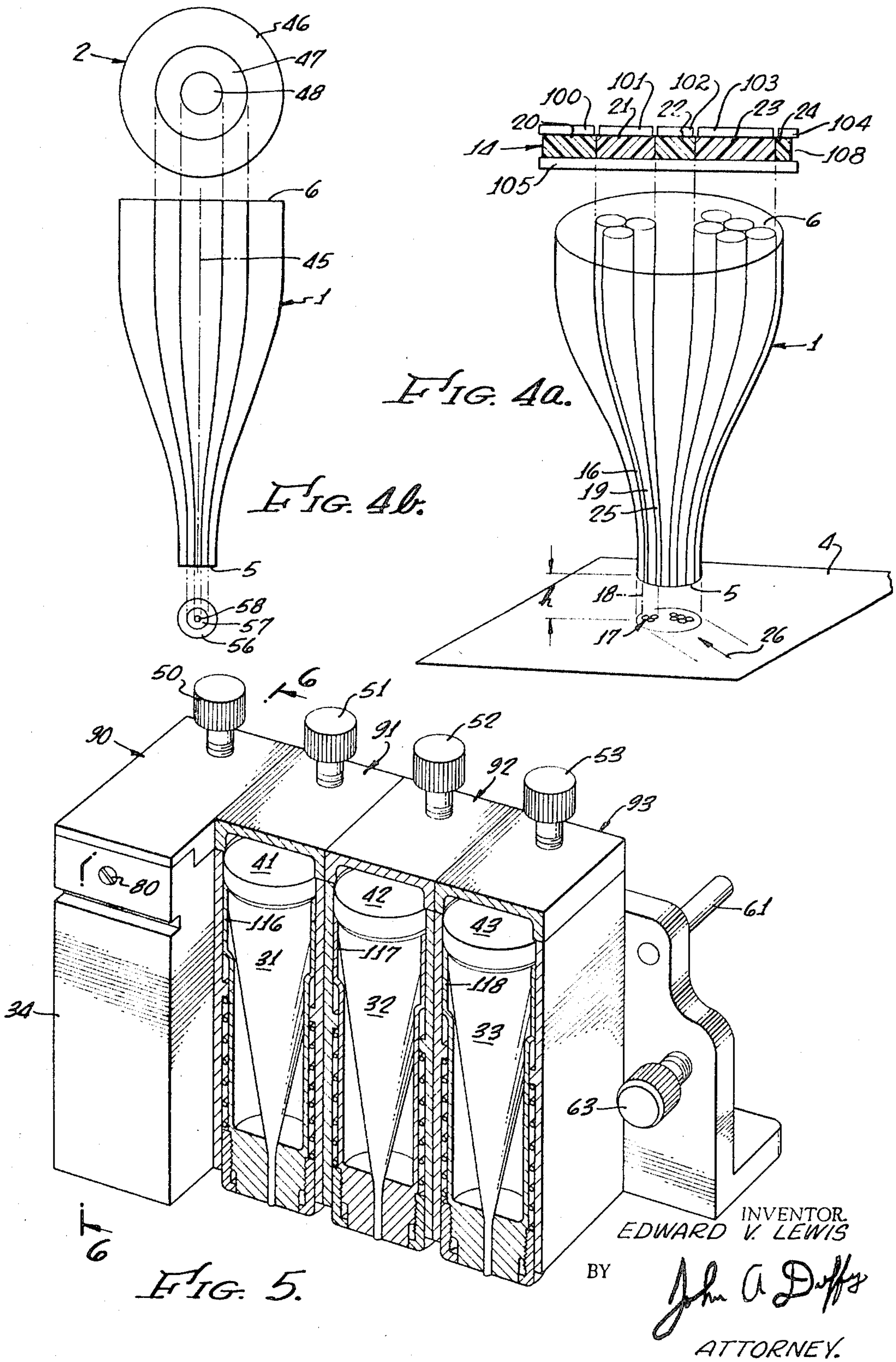
FIGURE 4*a* illustrates how beam characteristics may be altered by energizing panels within the numerical aperture of different fibers.
FIGURE 4*b* illustrates how the beam size may be altered without shifting its center.
FIGURE 5 illustrates an assembles for station cartridge.

The precise manner in which the aforementionel characteristics of the tapered fiber optic bundle may be used to facilitate the photographic recording of graphical information is illustrated in FIGURE 4*a*. The tapered bundle 1 is positioned above the plane of the recording medium 4 so as to have its exit aperture parallel therewith. The light source 14 is composed of segmented electroluminescent light panels 20–24 which may be separately excited so as to vary the spot size or shape 17 on the recording medium 4—or alternative to vary a line width when the beam 18 is moving relative to the medium 4, as indicated by the arrow 26. Thus, if the spot 17 is to be as shown then only panel segments which are within the numerical apertures of fibers 16, 19 and 25 should be excited, i.e., panel 21. Since only those meridional rays which enter at a small angle less than $\alpha$ (as given by Equation 3) will be transmitted, the emerging light beam 18 will be almost completely collimated so that there is not the usual constraint on focal plane flatness required by most optical systems.

Further advantage of the collimating feature is realized when the bundle is tapered. The proportional increase in light intensity enables constant nonvarying magnification to be achieved. It is thus possible to record extremely narrow and precise lines even when the height $h$ of the bundle 1 above the photographic material 4 fluctuates.

Another embodiment for varying the spot size is to make all panels of a form similar to that shown in FIG. 4*b*. Here the light panel 2 is segmented into 3 concentric circles 46–48 so that the spot formed by energizing the segments separately or in combination will be concentric with the optical axis 45 of the tapered bundle 1. This has an important advantage in that it is not necessary to correct for the positional shifts of the spot center when different panels are interchanged. Thus, by energizing panel 48, a single small spot 58 is obtained; by energizing 48 and 47 simultaneously, a larger spot 57, 58 is obtained; and by energizing 48, 47 and 46 simultaneously, a large spot 58, 57, 56 results. Obviously, the concentric structure is not limited to circles, but may be applied to any combination of geometric figures.

The details of the construction of the segmented light panel may be seen by reference to FIG. 4*a*. The substrate is comprised of separate metal conducting segments 100, 101, 102, 103 and 104, each of which serves the dual purpose of heat sink and separately energizable electrode. The other electrode 105 is formed of a thin layer of transparent conducting material which is desposited directly upon a phosphor 108 to form an electrode-phosphor-electrode sandwich. When a potential of approximately 500 v. is applied between the conductor 105 and any one of the substrate conductors 100 to 104, the corresponding phosphor segment 20–24 becomes a source of luminous energy. Basic units (which do not have separately energizable segments) are commercially available, a typical example being the Sylvania OGF 62468.

It has been observed that the light output from electroluminescent panels may be greatly increased in excess of the manufacturers ratings if a large amplitude, high frequency, low duration pulse is utilized for excitation. Where it is required (as discussed below) to rapidly switch the optical beam on and off as in the case where the movement is supplied via a digital plotter as shown in FIG. 8 or to vary its intensity, the pulse frequency control 110 and the pulse duration control 111 may be synchronized with logical commands controlling the beam movement.

Figure 6:
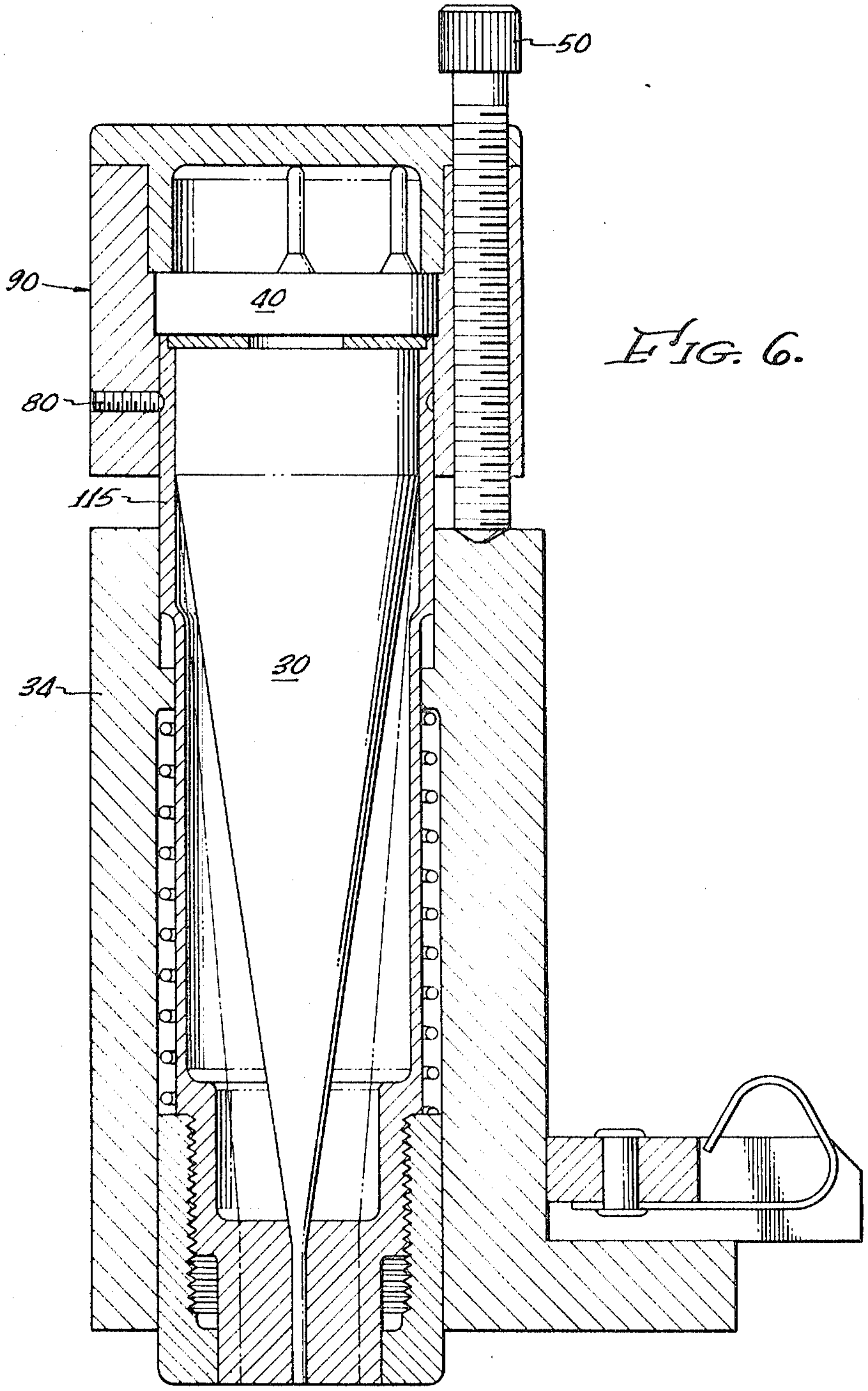
FIGURE 6 is a cross sectional view illustrating the fabrication details of a four station cartridge.

FIGURES 5 and 6 illustrate a four station optical writing cartridge embodiment of the basic principles of the invention discussed herein above. The four tapered bundles 30–33 and their associated light panels 40–43 are mounted to the moveable light assemblies 90–93 each of which fits over one of the columns 115–118 of the housing 34 and is separately adjustable with respect thereto. Once the height is adjusted by the thumb screws 50–53, the set screws 80–83 are tightened to prevent further motion between the assemblies 90–93 and the housing 34.

Both the tapering of the bundles and the light panel segmentation may be different for each assembly so that the number of possible spot sizes and/or shapes that can be obtained by automatically addressing the stations is equal to the product of the variables. Thus, for four different tapers each having an associated four segment panel, 16 different combinations are possible. Since both the tapered bundles 30–33 and light panels 40–43 may be manually interchanged or replaced with different units (by removing the light assemblies 90–93), an inexhaustible number of combinations is possible.

Figures 7, 8:
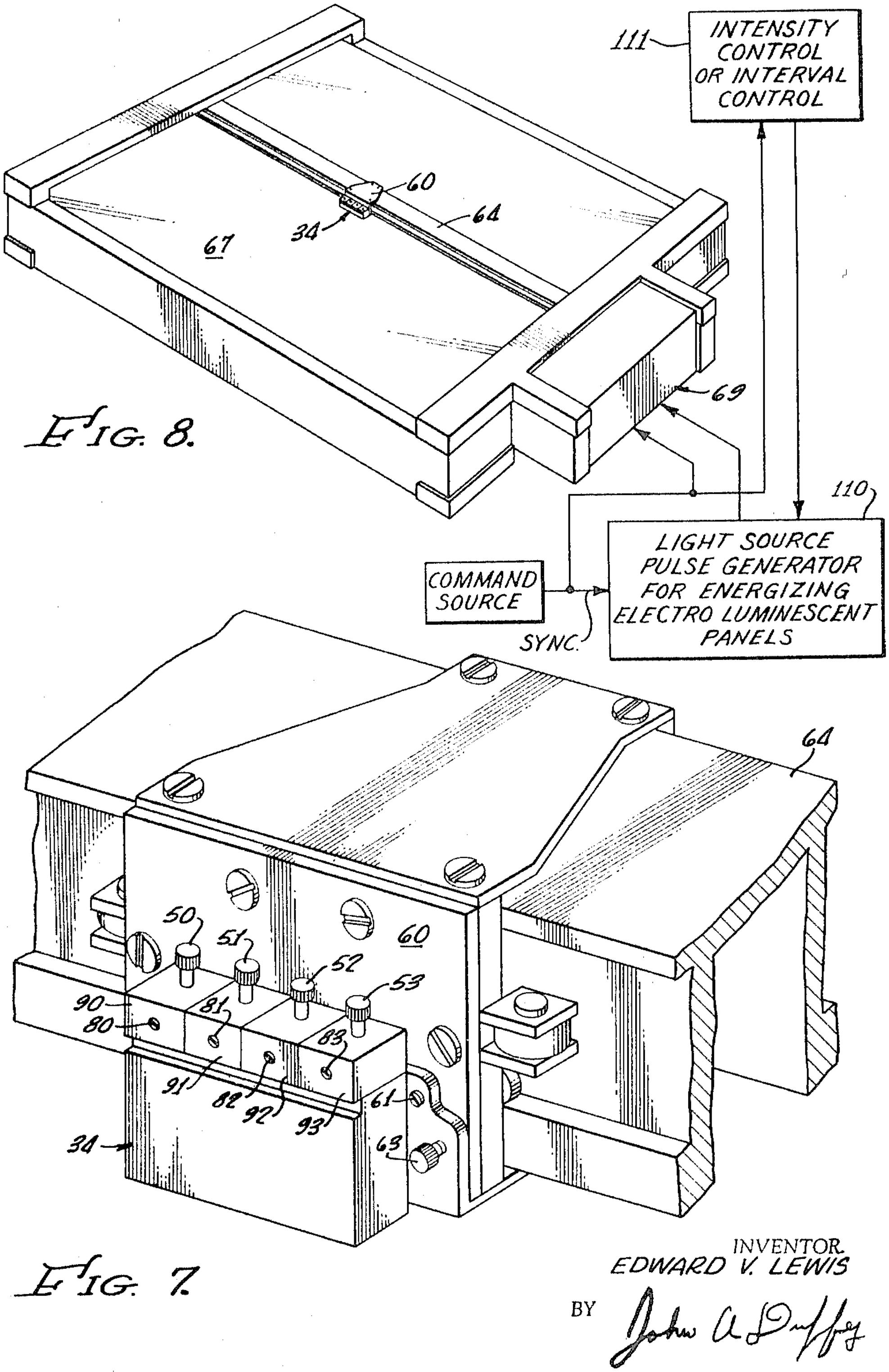
FIGURE 7 shows how the four station cartridge may be attached to the carriage of a graphical plotter.
FIGURE 8 shows the position relationships between the elements of the plotter and the attached cartridge.

The manner of attaching the writing head to a plotting apparatus is illustrated in FIG. 7. The positioning alignment of the housing 34 relative to the moveable carriage 60 is facilitated by guide pins 61 at the back of the housing (see FIG. 5) which fit into accordant holes located on the carriage 60. The housing is secured thereto by thumb screws 63 which thread into matching holes (not shown) on the carriage. When the housing is appropriately positioned on the plotter carriage 60 as shown in FIG. 8, light collimated by any of the taper bundles 30–33 will form a spot on the photosensitive recording medium 67. By appropriately programming the plotter 69 to account for the distance between the light stations 90–93, positioning of the proper station over a desired coordinate can be effectuated.

When the present invention is utilized in combination with an existing plotting device 69 as shown in FIG. 8, it is desirable to have available a means of regulating the beam intensity so that uniform exposure is realized irrespective of the speed of travel of the light beam with respect to the recording medium. Thus, assuming the beam 64 and carriage 60 of the plotter 69 are normally moved in digital increments, it is necessary to synchronize the pulsing of the light beam with such incremental movements in order to achieve uniform line widths. Furthermore, if the beam and carriage are capable of simultaneous movement then the beam intensity must be increased to account for the extra distance traveled per increment. As previously explained of these functions can be accomplished by synchronizing the light panel excitation with the electronic commands in the plotter so as to appropriately vary the luminous intensity. An important advantage of the electroluminescent light panel over other high intensity sources of monochromatic light is that they may be rapidly switched to achieve this result. The intensity may also be made manually or automatically adjustable in order to account for different recording medium sensitivities.

The light source pulse generation 110 is typically a one-shot multivibrator, which may be triggered by the command source to generate a coincident voltage pulse for energizing an electroluminescent panel. The intensity control 111 may employ a frequency to voltage converter for producing an excitation potential which is proportional to the step command rate. Thus, when the command rate is high, the amplitude of the excitation voltage will be proportionally increased in order to maintain a uniform line width independent of plotting speed. The design details of both the light source pulse generator 110 and the intensity control 111 have been omitted as they form no part of the present invention.

The present invention may be utilized in conjunction with either analog or incremental plotters having flat, drum or other bed configurations; it may be utilized in facsimile reproduction devices or in combination with general purpose recorders and oscillographs. The optical intensity may be modulated to record audio or video information. Other applications include generating masters for printing plates and accurate scale drafting and general use in combination with any apparatus utilized to draft drawings, charts and layouts.

Although a four station device has been illustrated in combination with an incremental plotter, it will be understood that the basic concept is equally applicable to alternative embodiments having a greater or lesser number of stations, and that the principles of the invention are not limited in application to utilization in combination with a specific apparatus, such description being made only by way of example and not as a limitation on the scope of the invention.

I claim:

1. In a graphical recording system having a photosensitive recording medium, a recordiing head comprising: at least one electroluminescent panel having a plurality of separately energizable segments; means for collimating said optical energy in a narrow beam; means for separately energizing said electroluminescent panels whereby the cross sectional characteristics of said beam may be varied.

2. The apparatus recited in claim 1 wherein said means for collimating said optical energy in a narrow beam comprises at least one tapered fiber optic bundle.

3. In combination with a graphical recorder adapted to use photosensitive recording medium, an optical writing cartridge comprising a housing having at least one station for writing, each of said writing stations comprising: a segmented electroluminescent panel for generating optical energy; a tapered fiber optic bundle adjacent to said panel for collimating the optical energy emitted by said segmented electroluminescent panel into a narrow beam.

4. The combination comprising: an incremental plotting machine adapted to use photosensitive recording medium; an optical writing cartridge having at least one station for recording on said photosensitive medium, and means for attaching said writing cartridge to said plotter, said cartridge comprising a plurality of stations each having a source for generating optical energy; means for concentrating the energy generated by each source into a collimated beam, each of said sources for generating optical energy comprising an electroluminescent light panel having a plurality of separately energizable segments.

5. The combination comprising: an incremental plotting machine adapted to use photosensitive recording medium; an optical writing cartridge having at least one station for recording on said photosensitive medium; means for attaching said writing cartridge to said plotter, said optical writing cartridge comprising a plurality of stations each having a source for generating optical energy; and a fiber optic bundle for concentrating the energy generated by each of said optical sources into a collimated beam.

6. An apparatus for photographically recording graphical information comprising: a bed for holding a photosensitive recording medium; a cartridge having a source for generating at least one beam of optical energy; means for moving said cartridge relative to said photosensitive medium whereby the motion of said optical energy beam may be graphically recorded; said cartridge comprising: a housing having a hole extended therethrough to form a cylindrical column; a light assembly having an aperture adapted to fit over said cylindrical column whereby said light assembly may be moved in sliding contact with said cylindrical column; and electroluminescent light panel having at least one separately energizable segment, said panel to be attached to said light assembly and moveable therewith, said light panel to be oriented to have its optical axis parallel with said cylinder column; a tapered fiber optic bundle attached to said light assembly and moveable therewith, said bundle to be positioned to have its entrance aperture adjacent to said panel, and aligned to collimate the energy from said panel in a beam parallel with said cylindrical column whereby said bundle may be moved within said cylinder hole as said light assembly is moved so as to vary the distance between the exit aperature of said bundle and said photosensitive medium.

7. An apparatus for photographically recording graphical information comprising: a bed for holding a photosensitive recording medium; a cartridge having a source for generating at least one beam of optical energy; means for moving said cartridge relative to said photosensitive medium whereby the motion of said optical energy beam may be graphically recorded, said cartridge comprising: a housing having a plurality of parallel columns, each of said columns having a cylindrical hole concentric therewith and extending through said housing; a plurality of light assemblies each having an aperture adapted to fit over said cylindrical columns whereby said light assemblies may be moved in sliding contact therewith; an electroluminescent light panel having at least one separately energizable segment attached to each of said light assemblies and moveable therewith, each of said light panels to be oriented to have its optical axis parallel with said cylinder columns; a tapered fiber optic bundle attached to each of said light assemblies and moveable therewith, each of said bundles to be positioned to have their entrance apertures adjacent to one of said panels and aligned to collimate the energy from said panel in a beam parallel with said cylindrical columns whereby each of said bundles may be moved within their associated cylinder holes as said associated light assembly is moved, so as to vary the distance between the exit apertures of said bundles and said photosensitive medium.

8. An apparatus for recording graphical information on photosensitive recording medium comprising: a cartridge having a plurality of sources for generating optical beams of different sizes and shapes; means for moving said cartridge relative to said photosensitive medium for recording thereon; means for varying said optical beams to accommodate for the speed of movement of said beam relative to said photosensitive medium; said cartridge comprising: a housing having a plurality of parallel columns, each of said colums having a cylindrical hole concentric therewith and extending through said housing; a plurality of light assemblies each having an aperture adapted to fit over said cylindrical columns whereby said light assemblies may be moved in sliding contact therewith; each of said plurality of sources comprising: an electroluminescent light panel having at least one separately energizable segment attached to each of said light assemblies and moveable therewith, each of said light panels to be oriented to have its optical axis parallel with said cylinder columns; a tapered fiber optic bundle attached to each of said light assemblies and moveable therewith, each of said bundles to be positioned to have their entrance apertures adjacent to one of said panels and aligned to collimate the energy from said panel in a beam parallel with said cylindrical columns whereby each of said bundles may be moved within their associated cylinder holes as said associated light assembly is moved, so as to vary the distance between the exit apertures of said bundles and said photosensitive medium.

9. The apparatus claimed in claim 8 wherein said means for moving said cartridge comprises an incremental recorder.

10. The apparatus claimed in claim 9 wherein said means for varying said optical beams comprises: a pulse generator responsively coupled to external plotter commands to synchronize and control the duration of energy applied to said panels whereby the exposure of said photosensitive medium is not dependent upon step magnitude and frequency.

11. An apparatus for recording graphical information on photosensitive recording medium comprising: a cartridge having a plurality of sources for generating optical beams of different sizes and shapes; means for moving said cartridge relative to said photosensitive medium for recording thereon; means for varying said optical beams to accommodate for the speed of movement of said beam relative to said photosensitive medium, said cartridge comprising: a housing having a hole extended therethrough to form a cylindrical column; a light assembly having an aperature adapted to fit over said cylindrical column whereby said light assembly may be moved in sliding contact with said cylindrical column; said plurality of sources comprising an electroluminescent light panel having a plurality of separately energizable segments, said panel to be attached to said light assembly and moveable therewith, said light panel to be oriented to have its optical axis parallel with said cylinder column; a tapered fiber optic bundle attached to said light assembly and moveable therewith, said bundle to be positioned to have its entrance aperture adjacent to said panel, and aligned to collimate the energy from said panel in a beam parallel with said cylindrical column whereby said bundle may be moved within said cylinder hole as said light assembly is moved so as to vary the distance between the exit aperture of said bundle and said photosensitive medium.

12. The apparatus claimed in claim 11 wherein said means for moving said cartridge comprises an incremental recorder.

13. The apparatus claimed in claim 12 wherein said means for varying said optical beams comprises: a pulse generator responsively coupled to external plotter commands to synchronize and control the durations of energy applied to said panels whereby the exposure of said photosensitive medium is not dependent upon step magnitude and frequency.

References Cited

UNITED STATES PATENTS

| | | | |
|---|---|---|---|
| 1,597,487 | 8/1926 | St. Clair | 346—108 |
| 2,368,839 | 2/1945 | Jansen | 95—1.1 |
| 2,992,587 | 7/1961 | Hicks et al. | 350—96 |
| 3,019,344 | 1/1962 | Seidman et al. | 250—213 X |
| 3,027,219 | 3/1962 | Bradley | 350—96 X |
| 3,235,672 | 2/1966 | Beguin | 250—227 X |
| 3,245,083 | 4/1966 | Wilson et al. | 346—109 |
| 3,258,776 | 6/1966 | Boyle et al. | 346—29 |
| 3,303,374 | 2/1967 | Fyler | 350—96 X |
| 3,330,182 | 7/1967 | Gerber et al. | 95—1 |

JOSEPH W. HARTARY, Primary Examiner

U.S. Cl. X.R.

346—108, 29; 350—96